(12) United States Patent
Ueyanagi

(10) Patent No.: US 7,099,096 B2
(45) Date of Patent: Aug. 29, 2006

(54) HEAT-ASSISTED MAGNETIC RECORDING HEAD AND HEAT-ASSISTED MAGNETIC RECORDING APPARATUS

(75) Inventor: Kiichi Ueyanagi, Minamiashigara (JP)

(73) Assignee: Fuji Xerox Co., Ltd., Tokyo (JP)

(\*) Notice: Subject to any disclaimer, the term of this patent is extended or adjusted under 35 U.S.C. 154(b) by 46 days.

(21) Appl. No.: 10/780,570

(22) Filed: Feb. 19, 2004

(65) Prior Publication Data
US 2004/0228022 A1 Nov. 18, 2004

(30) Foreign Application Priority Data
Feb. 19, 2003 (JP) ............................ 2003-041527
Feb. 20, 2003 (JP) ............................ 2003-042327

(51) Int. Cl.
*G11B 5/02* (2006.01)
(52) U.S. Cl. ....................................................... 360/59
(58) Field of Classification Search .................. 360/59, 360/126, 119, 123
See application file for complete search history.

(56) References Cited

U.S. PATENT DOCUMENTS 4,520,409 A \* 5/1985 Kimoto et al. ................. 360/59
6,325,947 B1 \* 12/2001 Garfunkel et al. ............. 216/22
6,493,183 B1 \* 12/2002 Kasiraj et al. ............... 360/126
6,671,127 B1 \* 12/2003 Hsu et al. ..................... 360/123
2001/0040868 A1 \* 11/2001 Ueyanagi et al. ............ 369/300

FOREIGN PATENT DOCUMENTS

JP      2003-45004      2/2003

OTHER PUBLICATIONS

T. Raush et al.; Magneto Optical Recording International Symposium; Moris '02 Digest Book.

\* cited by examiner

*Primary Examiner*—Wayne Young
*Assistant Examiner*—Varsha A. Kapadia
(74) *Attorney, Agent, or Firm*—Oliff & Berridge, PLC

(57) ABSTRACT

A heat-assisted magnetic recording head includes a thin film magnetic transducer having a pair of yokes and generating a magnetic field in a magnetic gap between two magnetic poles at the ends of the pair of yokes, and a heater placed in the vicinity of the magnetic gap and generating heat with an electric current. A part of a magnetic recording medium in the vicinity of the magnetic gap is heated by the heater to reduce a magnetic-coercive of the part of the magnetic recording medium and the magnetic field generated by the thin film magnetic transducer is applied to the part of the magnetic recording medium.

22 Claims, 7 Drawing Sheets

HEAT-ASSISTED MAGNETIC RECORDING HEAD AND HEAT-ASSISTED MAGNETIC RECORDING APPARATUS

BACKGROUND OF THE INVENTION

1. Field of the Invention

The invention relates to a heat-assisted magnetic recording head and a heat-assisted magnetic recording apparatus, and particularly to the heat-assisted magnetic recording head and heat-assisted magnetic recording apparatus that may reduce manufacturing processes and attain high density and high-speed recording.

2. Description of Related Art

In a hard disk drive (HDD) using a magnetic recording layer, high density recording has been achieved at a ratio of 60% per annum for several years by applying a magneto-resistive sensor which utilizes a magneto-resistive effect, that is, an MR (Magneto-resistive) sensor or GMR (Giant magneto-resistive) sensor (hereinafter both are referred to as "GMR sensor" collectively) and improving their performances.

However, it has become clear that the aerial density of HDD has a limit of about 40 Gbits/inch$^2$ due to the Super Para-magnetic effect, that is, the effect that the direction of magnetization in a magnetic domain is reversed to the opposite direction with the adjacent magnetization and thermal fluctuation, (on page 322, T. Rausch, Trans. of MAGNETICS Society of Japan, Vol. 2, 2002). After that, though the recording density has been improved to more than 100 Gbit/inch$^2$ by enhancing the anisotropy of the magnetic material, the density seems to approaching at last its limit given with the Super Para magnetic effect.

The heat-assisted magnetic recording has been proposed by Japanese Published Unexamined Patent Application No. 2003-45004 as an effective technique for solving the above.

In the heat-assisted magnetic recording head, a semiconductor laser (or optical waveguide), a thin film magnetic transducer and a GMR sensor are stacked, wherein magnetic recording is performed with reducing the magnetic cohesive force of a magnetic medium by irradiating a laser beam from the semiconductor laser to the medium and applying a magnetic field to the medium with the thin film magnetic transducer. Thus, the reversal of magnetization in the recording medium at the room temperature can be prevented as the recording is performed to the magnetic medium having a high cohesive force in the room temperature.

In this system, the recorded part should be cooled rapidly after recording. If not, the recoding would be erased with the subsequent magnetic field having the opposite magnetic direction. Accordingly, the both the magnetic field distribution and heat distribution must be sharp, and be placed together as closely as possible.

The heat-assisted magnetic recording head conventionally proposed, however, has the problem that, the stacking process is long and complicated, resulting in difficulty of reducing its cost since the semiconductor laser must be stacked in addition to the transducer and the GMR sensor. Further, the problem encountered is that high density recording is not achieved because a small recording mark cannot be always formed which size is equal with that of irradiated light spot, and the recording speed would be reduced since it is difficult to align the light-irradiation position to the magnetic field application position.

Further, a system has been proposed, in which a heater is provided on the opposite side of the GMR sensor to the thin film magnetic transducer, and an electric current is applied to the heater to perform heating. In this case, though adding of only a comparative short manufacturing process of the circuit to the conventional process will be sufficient, the problem that the difficulty of making the temperature distribution coincides with the magnetic field distribution remains yet.

SUMMARY OF THE INVENTION

The present invention has been made in view of the above circumstances and provides a heat-assisted magnetic recording head and heat-assisted magnetic recording apparatus, which may reduce manufacturing processes and attain high density recording and high speed.

In order to address the problems, a heat-assisted magnetic recording head, in which a magnetic recording medium is heated to lower an magnetic-coercive of a heated part, and a magnetic field is applied to the part decreased in its magnetic-coercive to record information, includes a pair of yokes; a thin film magnetic transducer which generate a magnetic field in a magnetic gap between two magnetic poles at ends of the pair of yokes; and a heater placed in the vicinity of the magnetic gap and generating heat with an electric current, whereby a part of a magnetic recording medium in the vicinity of the magnetic gap is heated by the heater and the magnetic field generated by the thin film magnetic transducer is applied to the part of a magnetic recording medium when a magnetic-coercive of the part of the magnetic recording medium is reduced.

BRIEF DESCRIPTION OF THE DRAWINGS

Preferred embodiments of the present invention will be described in detail based on the followings, and the invention is not limited to the followings, wherein:

FIG. 1A is a sectional view; FIG. 1B is a bottom view; FIG. 1C is a rear view in the direction of an arrow S in FIG. 1A;

FIG. 3A is a sectional view; FIG. 3B is a bottom view;

FIG. 5A is a sectional view; FIG. 5B is a bottom view; FIG. 5C is a rear view in the direction of an arrow S in FIG. 5A;

FIG. 8A is a sectional view; and FIG. 8B is a bottom view.

DETAILED DESCRIPTION OF THE INVENTION

Figure 1A:
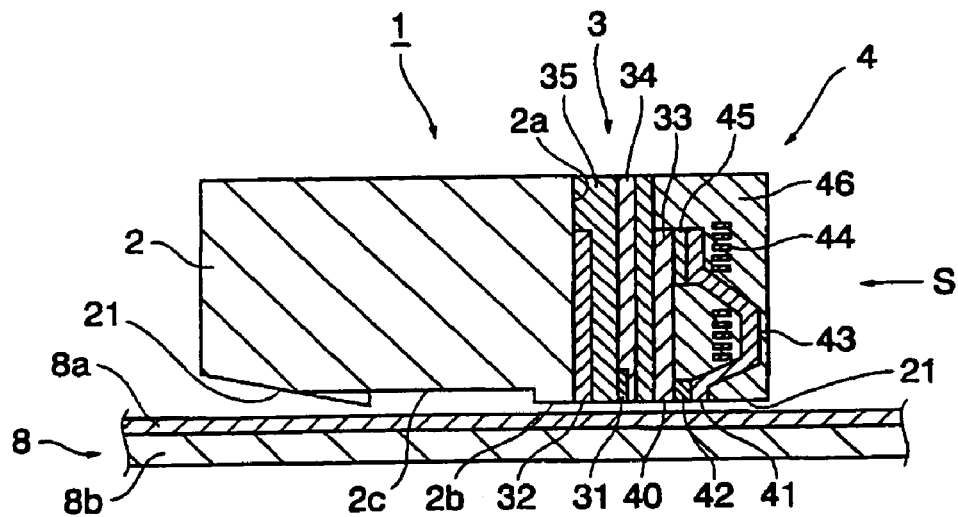
FIGS. 1A to 1C show a heat-assisted magnetic recording head according to a first embodiment of the invention.
Figure 1B:
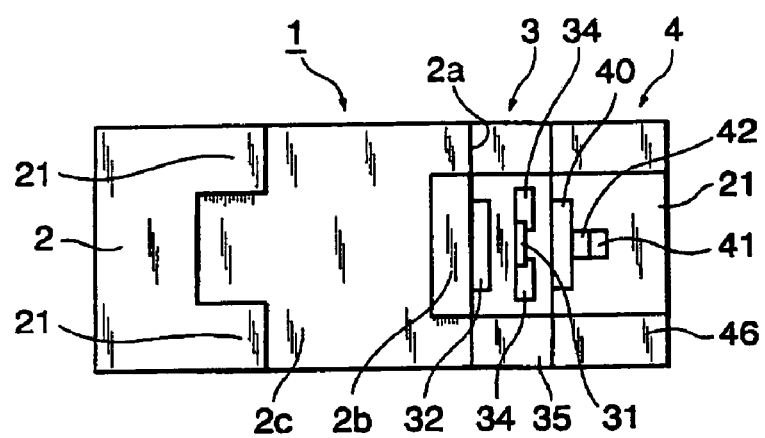
Figure 1C:
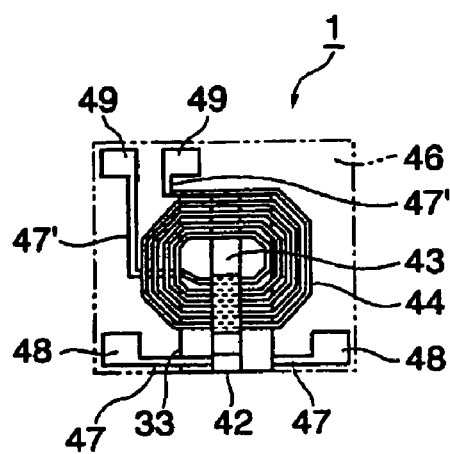
Figure 2:
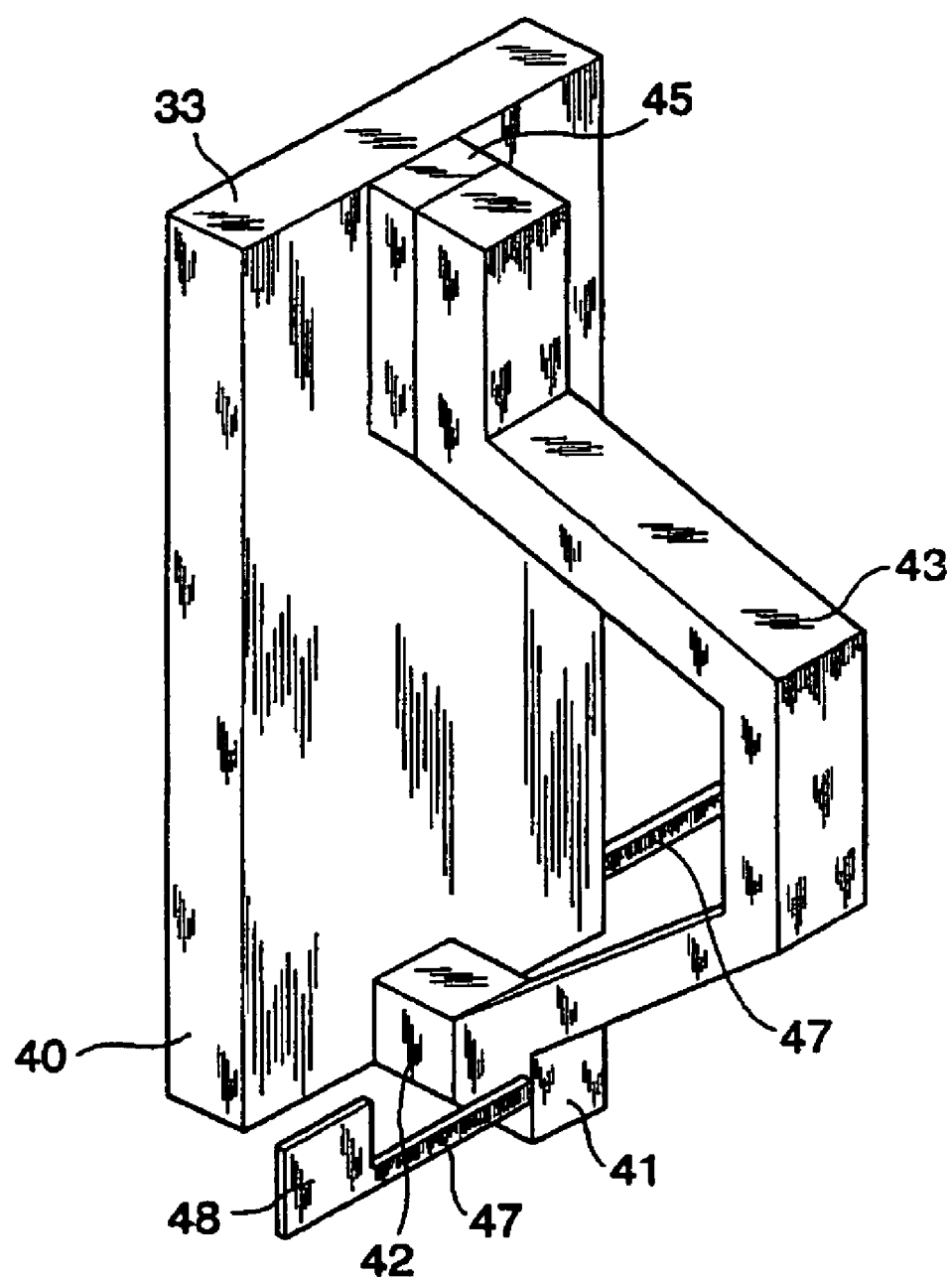
FIG. 2 is a typical diagram of a thin film magnetic transducer according to the first embodiment of the invention.

A heat-assisted magnetic recording head 1 includes a floating slider 2, a GMR sensor 3 stacked on the rear face 2a of the floating slider 2, and a thin film magnetic transducer 4 stacked on the rear face of the GMR sensor 3 and having a magnetic generating function and a heating function.

The floating slider 2 is formed of Al—Tic ($Al_2O_3$—$TiO_2$) and provided with a recess 2c and a floating surface 2b. The floating surface 2b is provided with air bearing surfaces 21 formed in three areas thereof, whereby the slider is adapted to run in the floating state above a magnetic recording layer 8a formed on a base plate 8b of a magnetic disk 8.

The GMR sensor 3 includes a spin valve film 31 having a magneto-resistive effect, and a pair of electrodes 34, 34 held between a magnetic barrier film 32 and a yoke 33 also serving as a magnetic barrier film through a dielectric layer 35 to feed an electric current to the spin valve film 31. The magnetic barrier film 32 and the yoke 33 shield the incidence of a floating magnetic field on the spin valve film 31, so that the leakage magnetic field from the magnetic recording layer 8a of the magnetic disk 8 is detected as a change in resistivity of the spin-valve film 31 to perform signal regeneration.

The thin film magnetic transducer 4 includes a magnetic circuit formed by the yokes 33, 43, and magnetic poles 40, 41 at the tips thereof, a magnetic coil 44 interlinked with the magnetic circuit, a spacer 42 filling the magnetic gap between the magnetic poles 40, 41, an insulating film 45 electrically insulating the other ends of the yokes 33, 43, a copper wire 47' connected to the magnetic coil 44, an electrode 49, a copper wire 47 connected to the yokes 33, 43, and an electrode 48. When the thin film magnetic transducer 4 is formed with dimensions such that the width from the yoke 33 to the magnetic pole 40 is 5 µm, the width of the yoke 43 is 3 µm and the thickness thereof is 0.3 µm, the width of the magnetic pole 41 is 0.06 µm and the length thereof is 0.3 µm, and the length from the connecting part to the copper wire 47 to each of the magnetic poles 40, 41 is 3 µm, the resistance of the yokes 33, 43 is about 0.5 to 1Ω, the resistance of the magnetic pole 41 is about 2Ω, and the resistance of the spacer 42 is 11Ω, so that most of heat generation when an electric current is applied across the yokes 33, 43 is performed in the spacer 42. Accordingly, in the case of electrical feeding with 10 mA at 1 Gbps, even in consideration of thermal conduction, the spacer 42 can be heated to 200° C. or higher. It can be heated near Curie temperature by increasing an applied current even. In the thin film magnetic. transducer 4, when an electric current is applied across the yokes 33, 43, the spacer 42 generates heat, and when an electric current based upon a record signal is let flow through the magnetic coil 44, a leakage magnetic filed is generated, and the magnetic recording layer 8a of the magnetic disk 8 is heated and simultaneously recording is performed.

The magnetic poles 40, 41 become non-magnetic when exceeding Curie temperature, so a material having high Curie temperature such as 45 Permalloy is used.

The spacer 42 is formed of a non-magnetic material with high electric resistance such as nichrome, and electrically connected to the magnetic poles 40, 41. The gap width and the gap length, that is, the dimensions of the spacer 42 are both 0.06 µm.

The insulating film 45 is formed of a thin film several tens of nm in thickness and made of $SiO_2$ or the like, and electrically separates the yokes 33, 43 from each other. The contact area is taken large such as several square µm, whereby the magnetic connecting state is kept between the yokes 33, 43.

The yokes 33, 43 have the electrode 48 connected through the copper wire 47 in a position comparatively near the magnetic poles 40, 41. The yokes 33, 43 are formed of material with relatively low resistance such as 78 Permalloy (volume resistivity: 16 µΩ-cm).

An example of a manufacturing method for the first embodiment of the heat-assisted magnetic recording head 1 according to the invention will now be described. A wafer which becomes the floating slider 2 uses Al—Tic ($Al_2O_3$—$TiO_2$) used in the heat-assisted magnetic recording head of the hard disk drive, and as the GMR sensor 3, an ordinary CMR (Giant Magnetic Sensor) is used. The yokes 32, 33, the electrode 34, the spin valve film 31 and the dielectric layer 35 are sequentially stacked in one dimension and in two dimensions on the Al—Tic wafer to form the GMR sensor 3. Further, the magnetic coil 44 and the yoke 43 are stacked and fixed by a dielectric spacer 46 to form the thin film magnetic transducer 4. A chip bar where the GMR sensor 3 and the thin film magnetic transducer 4 are arrayed in one dimension is sliced and picked to machine the section thereof as the floating surface 2b of the floating slider 2, and then cut to each head chip.

The operation of the first embodiment of the heat-assisted magnetic recording head 1 according to the invention will now be described. The heat-assisted magnetic recording head 1 runs in the floating state above the magnetic recording layer 8a formed on the base plate 8b of the magnetic disk 8 on the floating surface 2b having the recess 2c of the floating slider 2. When an electric current is let flow across the yokes 33, 43 through the electrode 48 and the copper wire 47 of the thin film magnetic transducer 4, the spacer 42 generates heat, thereby heating the magnetic recording layer 8a to lower magnetic-coercive. When an electric current according to a recording signal is fed to the magnetic coil 44 of the thin film magnetic transducer 4, a magnetic filed proportional to the current is generated in the magnetic gap. Thus, information is recorded in the part reduced in its magnetic-coercive of the magnetic recording layer 8a according to the modulation of the magnetic filed. The signal is regenerated by detecting a change in the intensity of magnetic field from the magnetic recording layer 8a interlinked with the spin valve film 31 as a change in resistance of the spin valve film 31.

According to the first embodiment of the invention described above, the following effects are produced.

(1) Most of heat generation when an electric current is applied across the yokes 33, 43 is performed in the spacer 42, and in the case of electric feeding with 10 mA at 1 Gbps, the spacer 42 can be heated to 200° C. or higher, the magnetic-coercive of the magnetic recording layer 8a can be lowered so as to be recorded by the thin film magnetic transducer 4.

For example, in the case of using a magneto-optical record medium such as TbFeCo for the magnetic recording layer 8a, it can be sufficiently heated to Curie temperature, so recording can be performed with a low magnetic field. Even in the case of a magnetic material whose Curie temperature is as high as several hundred degrees such as CoCr, the magnetic-coercive can be lowered by heating so as to be recorded by the thin film magnetic transducer 4.

(2) The heat-assisted magnetic recording head 1 according to the present embodiment is mainly intended for in-plane recording, so the magnetic gap is formed to have a small width, and the leakage magnetic field in the magnetic gap is used for recording. This can also be used for vertical magnetic recording.

The spacer 42 may use a low-resistance material such as copper. The resistance of the spacer 42 is lowered, whereby heat can be generated by the magnetic pole 41 with a high resistance value. In this case, the heat generation place and the magnetic field position can entirely coincide with each other so as to be effective for high-speed recording.

The yokes 33, 43 to the magnetic poles 40, 41 may be formed by lamination of thin films formed of low electric resistance material such as copper. Thus, the resistance of the yokes 33, 43 can be lowered for one tenth or smaller, and the magnetic pole 41 is caused to generate heat by lowering the resistance of the spacer 42. In this case, the heat generation place and the magnetic field position can entirely coincide with each other so as to be effective for high-speed recording. In the case of forming the yokes 33, 43 by lamination of copper thin films, the copper thin film may be manufactured by the same process for the copper wire 47. Thus, the resistance of the yokes 33, 43 can be lowered without any increase in process.

Instead of an $SiO_2$ film, ferrite or the like may be applied to the connecting part between the yokes 33, 43 to form a coating by sputtering. Thus, the magnetic resistance can be reduced while keeping the electric insulation on that part.

The copper wire 47 is enough brought close to the magnetic poles 40, 41 to thereby make the resistance of the upper part of the yoke sufficiently larger than the resistance in the electric circuit passing the spacer 42, so that even if the yoke 33 and the yoke 43 are not disconnected from each other by the insulating film 45, heat generation at this part is negligible. Further, only the upper part of the yoke may be replaced with Permalloy with high volume resistivity. Thus, a resistivity difference of the upper parts of the yokes can be increased.

Figure 3A:
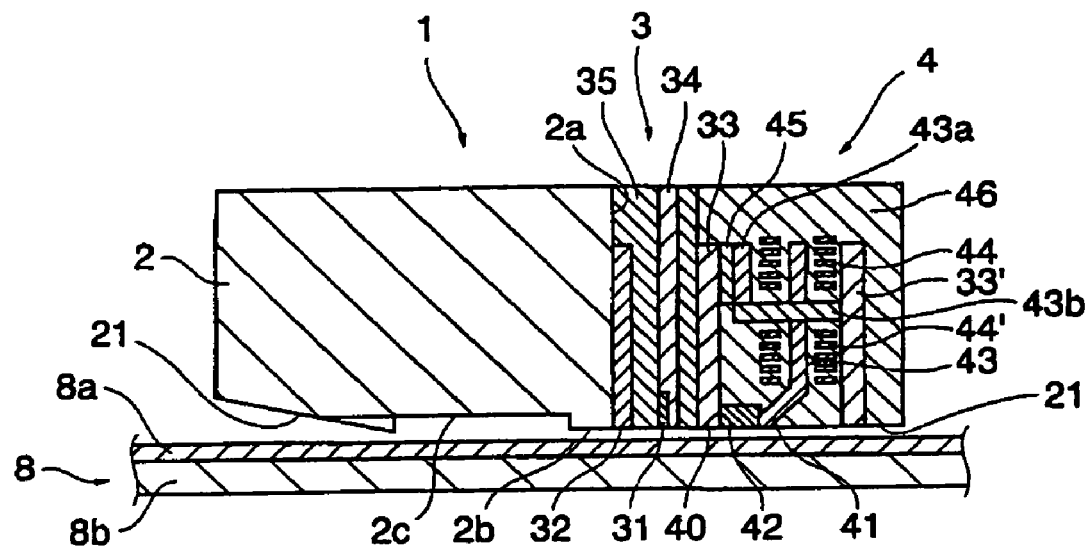
FIGS. 3A and 3B show a heat-assisted magnetic recording head according to a second embodiment of the invention.
Figure 3B:
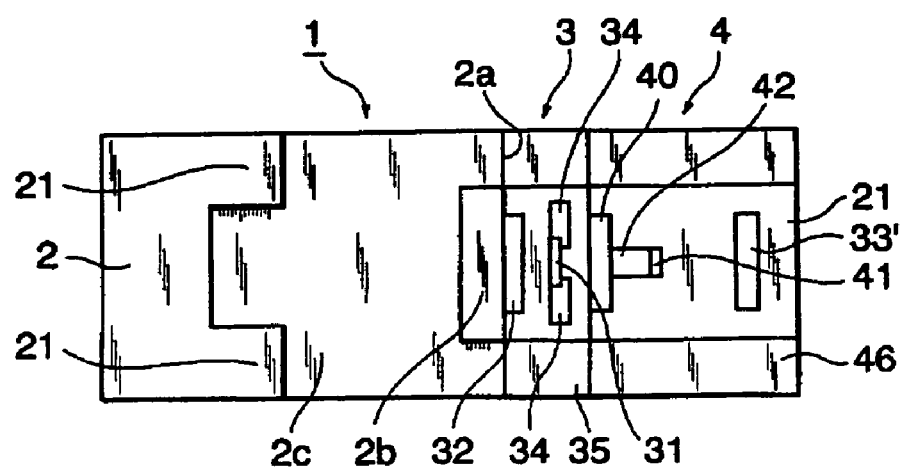

FIGS. 3A and 3B show a second embodiment of a heat-assisted magnetic recording head according to the invention, FIG. 3A is a sectional view, and FIG. 3B is a bottom view. The heat-assisted magnetic recording head 1 is a head for vertical magnetic recording, in which only a thin film magnetic transducer 4 is different from that of the first embodiment, and a floating slider 2 and a GMR sensor 3 are the same as those of the first embodiment. The descriptions of the slider and the sensor are omitted.

The thin film magnetic transducer 4 includes a yoke 43 having a single magnetic pole 41 at the tip, yokes 33, 33' also serving as a magnetic barrier film, and two magnetic coils 44, 44, and the magnetic poles 40, 41 constitute a magnetic circuit through a soft magnetic film laid under the magnetic recording layer 8a. The reference numerals 43a, 43b are connecting yokes connecting three yokes 33, 33', 43.

The yokes 33, 33' are mounted on both sides of the single magnetic pole 41 to prevent the single magnetic pole 41 from being influenced by the floating magnetic field. Accordingly, one magnetic pole 44' is wound in the reverse direction to the other magnetic coil 44 so that the direction of magnetization of the yokes 33, 33' is reverse to the direction of the single magnetic pole 41.

The single magnetic pole 41 and the other magnetic pole 40 are disposed at a short distance to reduce the magnetic flux directly connected between both poles. When the distance is too long, it is difficult for the single magnetic pole 41 and the spin valve film 31 of the GMR sensor 3 to run on the same track, so the distance is set to 0.3 μm for the width 0.06 μm of the single magnetic pole 41. The single magnetic pole 41 uses a material having relatively high Curie temperature and high electric resistance such as 45 Permalloy.

The space between the single magnetic pole 41 and the yoke 33 is filled with a spacer 42 formed of a conductive material to have conductivity. The conductive material uses a low-resistance material such as copper.

The operation of the second embodiment of heat-assisted magnetic recording head 1 according to the invention will now be described. The heat-assisted magnetic recording head 1 runs in the floating state above the magnetic recording layer 8a formed on the base plate 8b of the magnetic disk 8 through the floating surface 2b having the recess 2c of the floating slider 2. When an electric current is let flow across the yokes 33, 43 of the thin film magnetic transducer 4, the single magnetic pole 41 generates heat to thereby heat the magnetic recording layer 8a, so that the magnetic-coercive is lowered When an electric current according to a recording signal is fed to the magnetic coils 44, 44' of the thin film magnetic transducer 4, the magnetic field proportional to the current is generated in the magnetic gap. Thus, information is recorded in the part reduced in its magnetic-coercive of the magnetic recording layer 8a according to the modulation of the magnetic field. The signal is regenerated by detecting a change in intensity of the magnetic field from the magnetic recording layer 8a interlinked with the spin valve film 31 as a change in resistance of the spin valve film 31.

According to the second embodiment of the invention, the magnetic gap is filled up with the spacer 42 formed of a low-resistance material such as copper, whereby the resistance in that part is lowered so that heat can be generated at the part of the single magnetic pole 41 and the heat generation place and the magnetic field position can entirely coincide with each other to be effective for high-speed recording.

Figure 4:
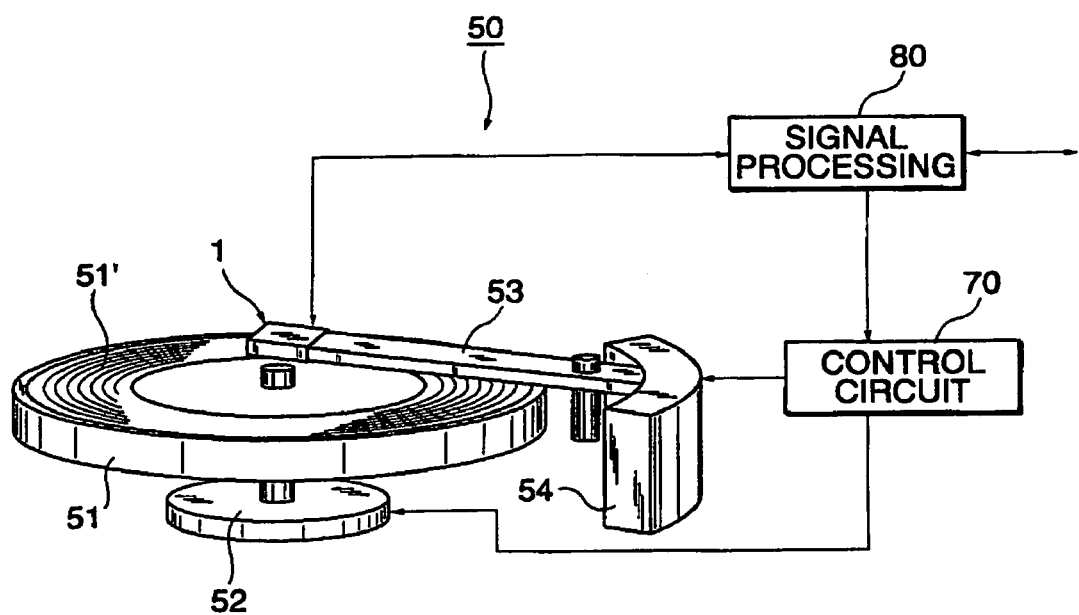
FIG. 4 is a typical diagram showing the principal part of a heat-assisted magnetic recording apparatus according to a third embodiment of the invention.

FIG. 4 shows the principal part of a heat-assisted magnetic recording apparatus according to a third embodiment of the invention. A heat-assisted magnetic recording apparatus 50 includes a magnetic disk 51 having a magnetic recording-layer 51', a motor 52 for rotating the magnetic disk 51, a heat-assisted magnetic head 1 according to the first and second embodiments for recording and reading to the magnetic recording layer 51', a swing arm 53 for scanning the heat-assisted magnetic head 1, a linear motor 54 for operating the swing arm 53, a control circuit 70 for conducting the control for the above, and a signal processing circuit 80 for processing a read and record signal.

The heat-assisted magnetic head 1 runs in the floating state above the magnetic recording layer 51' of the magnetic disk 51 rotated at a designated rotating speed by the control circuit 70 to perform read and record following a designated recording track.

As a magnetic recording layer 51' of the magnetic disk 51, for example, a TbFeCo film used in magneto-optical recording is used.

The operation of the third embodiment of the heat-assisted magnetic recording apparatus 50 according to the invention will now be described. In recording, when an electric current is fed across the yoke 33 and the yoke 43 according to a recording mark formation signal output from the signal processing circuit 80, the magnetic recording layer 51' right under the magnetic pole 41 is heated about 200° C. and simultaneously an electric current according to the recording signal is applied to generate a magnetic field in the magnetic gap where the spacer 42 is embedded, thereby forming a magnetic recording mark in the magnetic recording layer 51'.

In order to perform stable recording, it is important to heat up to the same temperature within the plane of the magnetic disk 51 and to rapidly cool down the temperature of the magnetic recording layer 51' to the level not to exert any influence upon the recording mark immediately after recording. Therefore, a heating current is gradually increased as it goes from the inner peripheral side to the outer peripheral side. Although the increase rate depends on the disk structure or the record medium, the disk can be heated to the same temperature by increasing the heating current in proportion to the square root to first power of the peripheral speed in order to perform rapid cooling after recording, an electric current for heating is applied to be pulsed, and the timing is adjusted to be a little earlier than that of applying a magnetic field applying current so that when the temperature starts to drop, the magnetic field is applied. Although the extent of making earlier the application timing also depends upon the rotating speed of the record medium or the disk, about 10% to 50% of the pulse duration is suitable.

According to the third embodiment of the invention, the heat-assisted magnetic recording head where the heat generation place and the magnetic field position coincide with each other is used, whereby recording can be performed with relatively weak magnetic field application, so that, high-density and high-speed heat-assisted magnetic recording can be performed. Furthermore, even in the film with a high magnetic anisotropy, with the magnetic-coercive lowered, recording can be performed.

Although the number of disks is one in the third embodiment, the so-called Winchester disk where two or more disks are stacked may be adopted.

The interval of applying a heating current pulse is made shorter than the interval of a magnetic field application pulse, whereby the temperature of the magnetic recording layer 51' can be rapidly cooled down to the level not to exert any influence upon the recording mark immediately after recording.

According to the present embodiment, as described above, the generation position of the magnetic field and the generation position of Joule heat coincide with each other, whereby the micro-recording mark can be made so as to achieve high density recording. Furthermore, since recording can be performed immediately after heating, high-speed recording can be attained. Since the generation of the magnetic field and the heat generation are performed with the thin film magnetic transducer, the number of parts can be decreased so as to reduce-the manufacturing process.

Figure 5A:
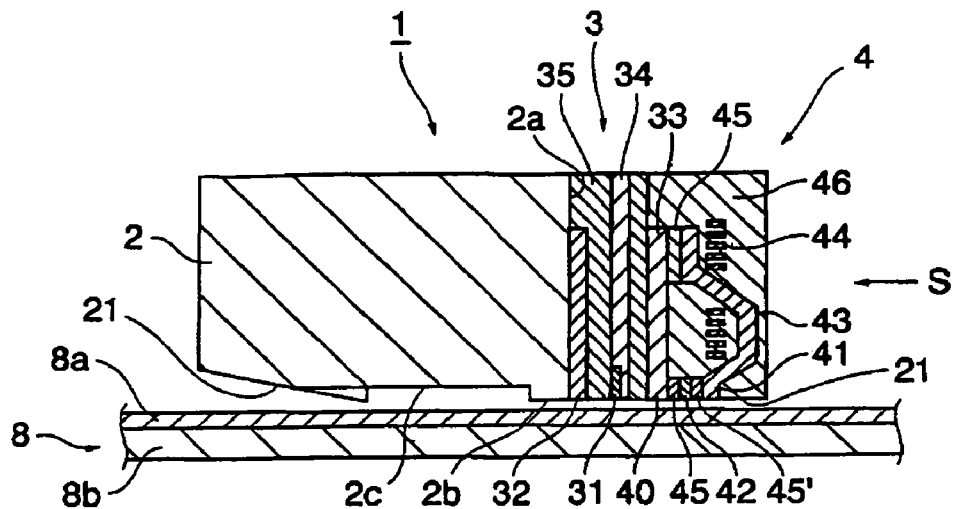
FIGS. 5A to 5C show a heat-assisted magnetic recording head according to a fourth embodiment of the invention.
Figure 5B:
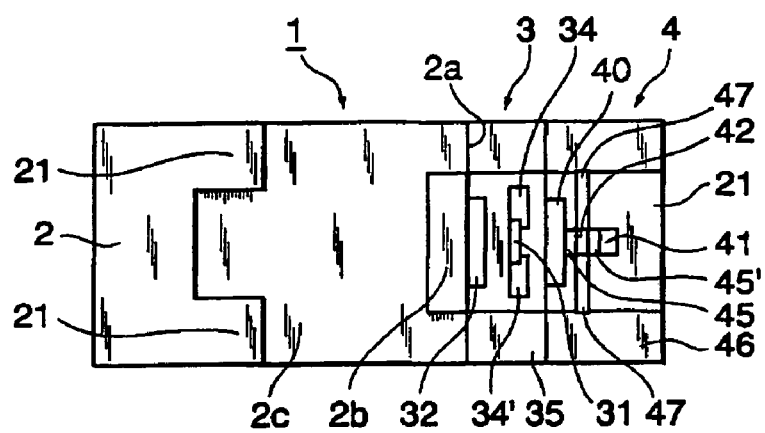
Figure 5C:
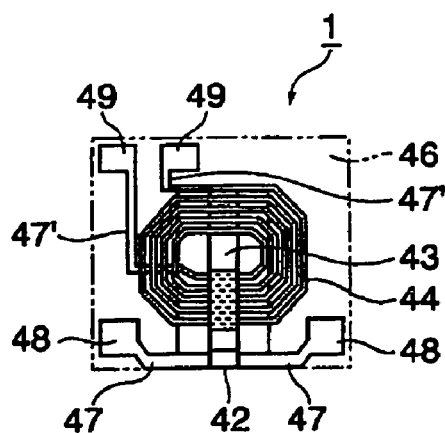
Figure 6:
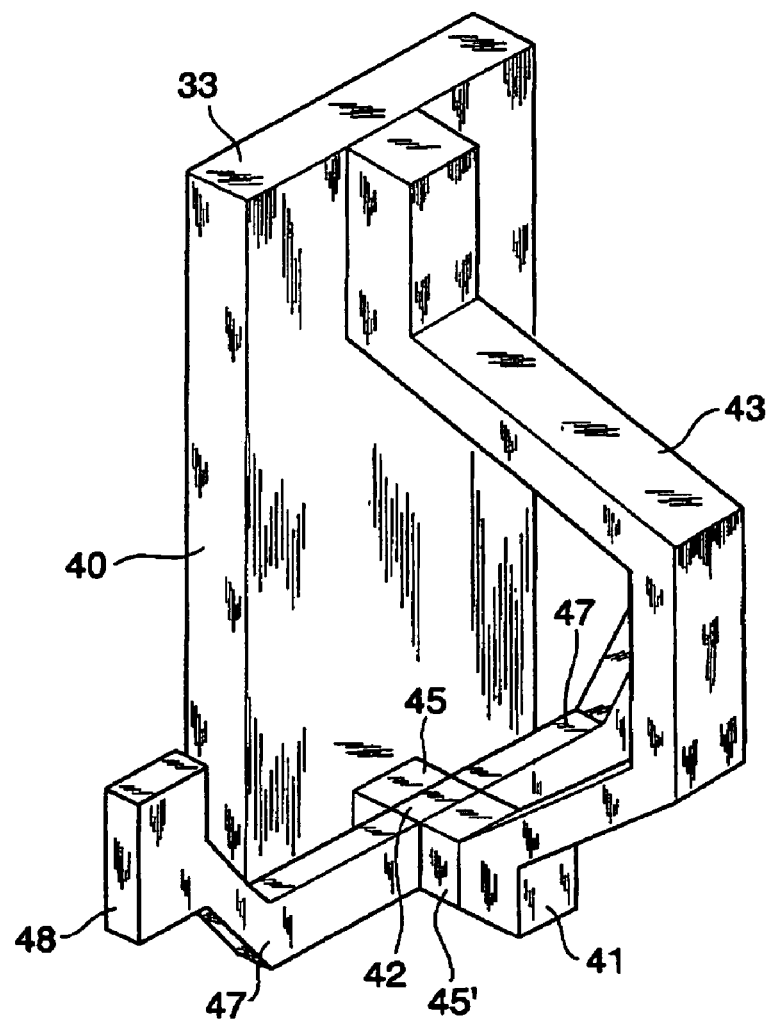
FIG. 6 is a typical diagram of a thin film magnetic transducer according to the fourth embodiment.

FIGS. 5A to 5C shows a fourth embodiment of a heat-assisted magnetic recording head according to the invention, FIG. 5A is a sectional view, FIG. 5B is a bottom view, and FIG. 5C is a rear taken in the direction of an arrow S. FIG. 6 is a typical diagram of a thin film magnetic transducer with a magnetic coil omitted. This heat-assisted magnetic recording head 1 includes a floating slider 2, a GMR sensor 3 stacked on the rear face 2a of the floating slider 2, and a thin film magnetic transducer 4 stacked on the rear face of the GMR sensor 3 and having a magnetic fielding function and a heat generation function.

The floating slider 2 is formed of Al—Tic (Al$_2$O$_3$—TiO$_2$) used in the heat-assisted magnetic recording head of a hard disk drive, and provided with a recess 2c and a floating surface 2b. The floating surface 2b is provided with three air bearing surfaces 21, whereby the floating slider runs in the floating state above a magnetic recording layer 8a formed on a base plate 8b of a magnetic disk 8.

The GMR sensor 3 includes a spin valve film 31 having a magnetoresistive effect, and a pair of electrodes 34, 34' held between a magnetic barrier film 32 and a yoke 33 also serving as a magnetic barrier film through a dielectric layer 35 to feed an electric current to the spin valve film 31. The magnetic barrier film 32 and the yoke 33 shields the incidence of a floating magnetic field on the spin valve film 31, whereby a leakage magnetic filed from the magnetic recording layer 8a of the magnetic disk 8 can be detected as a change in resistance of the spin valve layer 31 to perform signal regeneration.

The thin film magnetic transducer 4 includes a magnetic circuit formed by yokes 33, 43 and magnetic poles 40, 41 at the tip thereof, a magnetic coil 44 interlinked with the magnetic circuit, a spacer 42 as a heat generating member filling up the magnetic gap between the magnetic poles 40, 41, dielectrics 45, 45' formed of a thin film 0.04 nm made of SiO$_2$ or the like to electrically insulate the magnetic poles 40, 41 from the spacer 42, a copper wire 47' and an electrode 49 connected to the magnetic coil 44, a copper wire 47 connected to the spacer 42, and an electrode 48. In the thin film magnetic transducer 4, an electric current is applied to the spacer 42 so that the spacer 42 generates heat, and an electric current according to a recording signal is let flow through the magnetic oil 44 to generate a leakage magnetic field, thereby heating the magnetic recording layer 8a of the magnetic disk 8 and performing recording.

Since the magnetic poles 40, 41 become non-magnetic when exceeding Curie temperature, a material having high Curie temperature such as 45 Permalloy is used for the magnetic poles.

The spacer 42 is formed of non-magnetic material having high electric resistance and high heat resistance such as tantalum (volume resistivity: 16.7 μΩ-cm). Low-resistance wires 47, 47 made of copper are connected to the spacer 42 at right angles to the directions of the yokes 33, 43. When the length in the electric feeding direction of the spacer 42 is 0.06 μm and the section is 0.04×0.1 μm the resistance value of the spacer 42 is 42Ω. In the case of applying an electric current to that part with 5 mA at 1 Gbps, even in consideration of thermal conduction, the spacer 42 can be heated to 30° C. or more. In order to heighten the heating effect to the record medium, the spacer 42 is formed so that the heating part of the spacer 42 is brought close to the air bearing surfaces 21 of the floating slider 2 and the bottom sides of the wires 47, 47 are also brought close to the air bearing surfaces 21.

An example of manufacturing method for the heat-assisted magnetic recording head 1 will now be described. A wafer serving as the floating slider 2 uses Al—Tic (Al$_2$O$_3$—TiO$_2$), and the GMR sensor 3 uses an ordinary GMR (Giant Magnetic Sensor). The yokes 32, 33, the electrodes 34, 34' and the spin valve film 31 are sequentially stacked in one dimension or in two dimensions on the wafer made of Al—Tic through the dielectric layer 35 to form the GMR sensor 3. Further, the magnetic coil 44 and the yoke 43 are stacked and fixed by a dielectric spacer 46 to form a thin film magnetic transducer 4. A chip bar where the GMR sensor 3 and the thin film magnetic traducer 4 are arrayed in one dimension is sliced and picked to machine the section thereof as the floating surface 2b of the floating slider 2, and then cut to each head chip.

The operation of the fourth embodiment of heat-assisted magnetic recording head 1 will now be described. The heat-assisted magnetic recording head 1 runs in the floating state above the magnetic recording layer 8a formed on the base plate 8b of the magnetic disk 8 on the floating surface 2b having the recess 2c of the floating slider 2. When an electric current is let flow through the spacer 42 through the electrode 48 and the copper wire 47 of the thin film magnetic transducer 4, the spacer 42 generates heat, thereby heating the magnetic recording layer 8a to lower magnetic-coercive. When an electric current according to a recording signal is fed to the magnetic coil 44 of the thin film magnetic transducer 4, a magnetic filed proportional to the current is generate in the magnetic gap. Thus, information is recorded in the part reduced in its magnetic-coercive of the magnetic recording layer 8a according to the modulation of the magnetic filed. The signal is regenerated by detecting a change in the intensity of a magnetic field from the magnetic recording layer 8a interlinked with the spin valve film 31 as a change in resistance of the spin valve film 31.

According to the fourth embodiment, the following effect can be produced.

(1) In the case of electric feeding with 5 mA at 1 Gbps, the spacer 42 can be heated to 300° C. or higher the magnetic-coercive of the magnetic recording layer 8a can be lowered so as to be recorded by the thin film magnetic transducer 4. For example, in the case of using a magneto-optical record medium such as TbFeCo for the magnetic recording layer 8a, it can be sufficiently heated to Curie temperature, so recording can be performed with a low magnetic field. Even in the case of a magnetic material whose Curie temperature is as high as several hundred degrees such as CoCr, the magnetic-coercive can be lowered by heating so as to be recorded by the thin film magnetic transducer 4.

(2) The heat-assisted magnetic recording head 1 according to the present embodiment is mainly intended for in-plane recording, so the magnetic gap is formed to have a small width, and the leakage magnetic field in the magnetic gap is used for recording to the magnetic recording medium. This can also be used for vertical magnetic recording.

The spacer 42 can be formed using even a material having a low electric resistance such as molybdenum and tungsten, which can be increased in resistance by reducing the film thickness and width.

Figure 7:
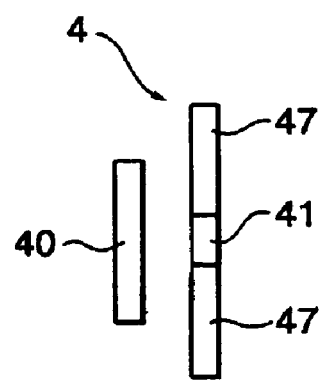
FIG. 7 is a bottom view showing a heat-assisted magnetic recording head according to a fifth embodiment of the invention.

FIG. 7 shows the principal part of a fifth embodiment of a heat-assisted magnetic recording head according to the invention. The heat-assisted magnetic recording head 1 is a magnetic head for vertical magnetic recording head, in which only a thin film magnetic transducer 4 is different from that of the fourth embodiment, and a floating slider 2 and a GMR sensor 3 are the same as those of the fourth embodiment. The description of the slider and the sensor is omitted. In this thin film magnetic transducer 4, wires 47, 47 are connected to one magnetic pole 41' as a heat generating member. Although the wire is connected to the spacer 42 in the direction right-angled to the magnetic circuit in FIG. 5, the wires 47, 47 are connected to the magnetic pole 41' in the direction right-angled to the magnetic circuit. In this arrangement, high heat resistance is required for the magnetic pole 41', so the magnetic pole 41' is formed of a material whose Curie temperature is comparatively high and having high electric resistance such as 45 Permalloy.

According to the fifth embodiment, the magnetic pole 41' itself can be heated, so that the heat generation place and the magnetic field position can entirely coincide with each other so as to attain high speed recording. Furthermore, the wires 47, 47 are connected to the magnetic pole 41 of the conventional thin film magnetic transducer 4, whereby the present embodiment of the heat-assisted magnetic recording head 1 can be easily manufactured.

Figure 8A:
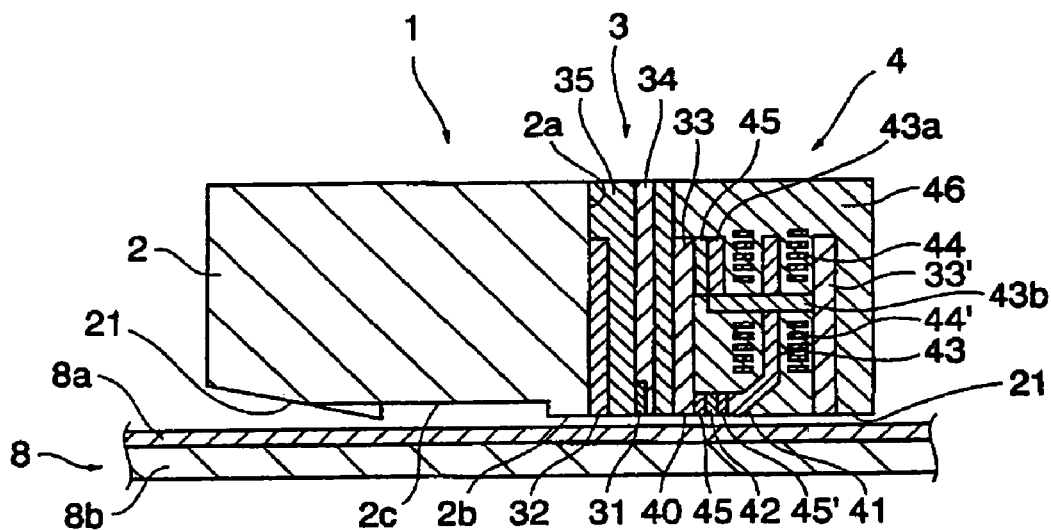
FIGS. 8A and 8B show a heat-assisted magnetic recording head according to a sixth embodiment of the invention.
Figure 8B:
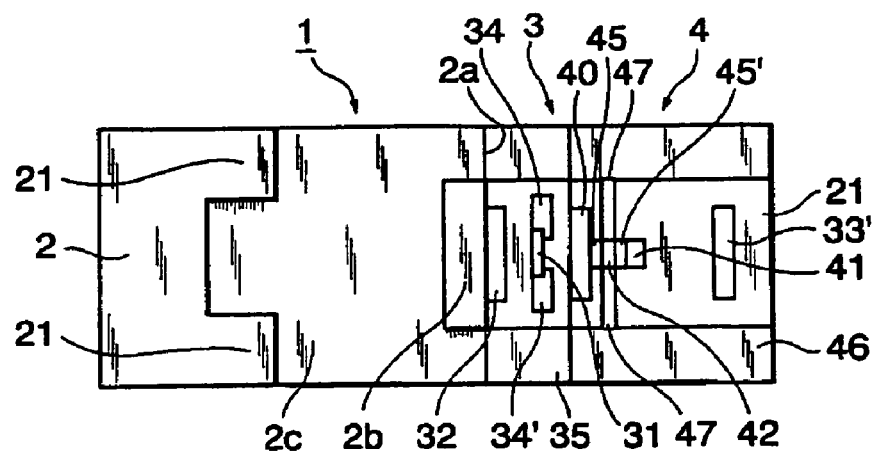

FIGS. 8A and 8B show a sixth embodiment of a heat-assisted magnetic recording head 1, FIG. 8A is a sectional view, and FIG. 8B is a bottom view. In the heat-assisted magnetic recording head 1, only a thin film magnetic transducer 4 is different from that of the fourth embodiment, and a floating slider 2 and a GMR sensor 3 are the same as those of the fourth embodiment The description of the slider and the sensor is omitted.

The thin film magnetic transducer 4 includes a yoke 43 having a single magnetic pole 41 at the tip, yokes 33, 33' serving as a magnetic barrier film, and two magnetic coils 44, 44', and the poles 40, 41 constitute a magnetic circuit through a soft magnetic film laid under the magnetic recording layer 8a formed by a vertical magnetic film. The reference numeral 43b designates a connecting yoke connecting three yokes 33, 33' and 43.

The yokes 33, 33' are disposed on both sides of the single magnetic pole 41 to prevent the single magnetic pole 41 from being influenced by a floating magnetic field. Accordingly, one magnetic coil 44' is wound in the reverse direction to the other magnetic coil 44 so that the direction of magnetization of the yokes 33, 33' is reverse to the single magnetic pole 41.

The single magnetic pole 41 and the other magnetic pole 40 are disposed at a short distance to reduce the magnetic flux directly connected between both poles. When the distance is too long, it is difficult for the single magnetic pole 41 and the spin valve-film 31 of the GMR sensor 3 to run on the same track, so the distance is set to 0.3 μm for the width 0.06 μm of the single magnetic pole 41. The single magnetic pole 41 forms a magnetic closed circuit with a soft magnetic film formed in the lower layer of the magnetic recording layer of a magnetic recording medium not shown.

Similarly to the fourth embodiment, a spacer 42 formed of a conductive material, to which wires 47, 47 are connected, is formed through dielectrics 45, 45 between the single magnetic pole 41 and the magnetic pole 40 of the yoke 33 to thereby heat the vicinity of the single magnetic pole 41. The type, size and the like of the conductive material of the spacer 42 are similar to those of the fourth embodiment. Thus, heat generation can be caused in the vicinity of the single magnetic pole 41 to perform heat-assisted magnetic recording similar to that in the fourth embodiment.

The operation of the sixth embodiment of the heat-assisted magnetic recording head 1 will now be described. The heat-assisted magnetic recording head 1 runs in the floating state above the magnetic recording layer 8a formed on the base plate 8b of the magnetic disk 8 through the floating surface 2b having the recess 2c of the floating slider 2. When an electric current is let to flow across the copper wires 47, 47, the spacer 42 generates heat to thereby heat the magnetic recording layer 8a, so that the magnetic-coercive is lowered. When an electric current according to a recording signal is fed to the magnetic coils 44, 44' of the thin film magnetic transducer 4, the magnetic field proportional to the current is generated in the magnetic gap. Thus, information is recorded in the part reduced in its magnetic-coercive of the magnetic recording layer 8a according to the modulation of the magnetic field. The signal is regenerated by detecting a change in intensity of the magnetic field from the magnetic recording layer 8a interlinked with the spin valve film 31 as a change in resistance of the spin valve film 31.

According to the sixth embodiment, an electric current is applied to the spacer 42 formed in the magnetic gap in the direction right-angled to the magnetic circuit, whereby heat generation can be caused in the vicinity of the singe magnetic pole 41 so that the heat generation place and the magnetic field position can coincide with each other so as to be effective for high speed recording.

The film thickness of the dielectric 45' on the single magnetic pole 41 side can be reduced to thereby bring the spacer 42 and the single magnetic pole 41 close to each other, so that the heat generation place and the magnetic field position can coincide with each other so as to be effective for stable recording.

The principal part of a seventh embodiment of a heat-assisted magnetic recording apparatus according to the invention is common to that in FIG. 4 showing the third embodiment. The heat-assisted magnetic recording apparatus 50 includes a magnetic disk 51 having a magnetic recording layer 51', a motor 52 for rotating the magnetic disk 51, the heat-assisted magnetic head 1 according to the first, second or fifth embodiment for recording and reading on the magnetic recording layer 51', a swing arm 53 scanning the heat-assisted magnetic head 1, a linear motor 54 for operating the swing arm 53, a control circuit 70 for controlling the above, and a signal processing circuit 80 for processing a read and record signal.

The heat-assisted magnetic head 1 runs in the floating state above the magnetic recording layer 51' of the magnetic disk 51 rotated at a designated rotating speed by the control circuit 70 to thereby perform recording and reading following a designated recording track.

The magnetic recording layer 51' of the magnetic disk 51 uses a TbFeCo film used in magneto-optic recording or the like.

The operation of the seventh embodiment of the heat-assisted magnetic recording apparatus 50 will now be described. In recording, when an electric current is fed to the spacer 42 according to a recording mark formation signal output form the signal processing circuit 80, the magnetic recording layer 51' right under the magnetic pole 41 is heated to about 300° C. and simultaneously an electric current based on a recording signal is applied to the magnetic coil 44 to generate a magnetic field in the magnetic gap where the spacer 42 is embedded, thereby forming a magnetic recording mark in the magnetic recording layer 51'.

In order to perform stable recording, it is important to heat to the same temperature within the plane of the magnetic disk 51, and to rapidly cool down the temperature of the magnetic recording layer 51' to the level not to exert any influence upon the recording mark immediately after recording. Therefore, the heating current is gradually increased as it goes from the inner peripheral side to the outer peripheral side. At that time, although such increase depends on the disk structure and the record medium, the current is increased in proportion to the square root to first power of the peripheral speed, whereby heating can be performed up to the substantially same temperature. In order to perform rapid cooling after recording, an electric current for heating is applied to be pulsed, and the timing is adjusted to be a little earlier than that of applying a magnetic field applying current so that when the temperature starts to drop, the magnetic field is applied. Although the extent of making earlier the application timing also depends upon the rotating speed of the record medium or the disk, about 10% to 50% of the pulse duration is suitable.

According to the seventh embodiment of the invention, the heat-assisted magnetic recording head where the heat generation place and the magnetic field position coincide with each other is used, whereby recording can be performed with relatively weak magnetic field application, so that high-density and high-speed heat-assisted magnetic recording can be performed. Furthermore, even in the film with a high magnetic anisotropy, with the magnetic-coercive lowered, recording can be performed.

Although the number of disks is one in the third embodiment, the so-called Winchester disk where two or more disks are stacked may be adopted. The interval of applying a heating current pulse can be made shorter than the interval of magnetic field application pulse, whereby the temperature of the magnetic recording layer 51' is rapidly cooled down to the level not to exert any influence upon the recording mark immediately after recording.

According to the present embodiment, as described above, the generation position of the magnetic field and the generation position of Joule heat coincide with each other, whereby the micro-recording mark can be made so as to achieve high density recording. Furthermore, since recording can be performed immediately after heating, high-speed recording can be attained. Since the generation of the magnetic field and the heat generation are performed with the thin film magnetic transducer, the number of parts can be decreased so as to reduce the manufacturing process.

In the heat-assisted magnetic recording head of the invention, the heater may include a conductor electrically connected to the two magnetic poles placed at the magnetic gap, whereby the conductor generates heat by applying an electric current through the yokes. When an electric current is fed to the conductor disposed in the gap through the yokes, the conductor is caused to generate heat by Joule heat, thereby heating the magnetic recording medium to lower a magnetic-coercive. Information is recorded in the part decreased in magnetic-coercive by the magnetic field from the magnetic gap.

In this configuration, a leakage magnetic field generated in the magnetic gap can coincide with the generation position of Joule heat generated in the conductive member disposed in the magnetic gap so as to perform high-speed and high-density heat-assisted magnetic recording.

In the heat-assisted magnetic recording head of the invention, the heater may alternatively include a heat generating member placed at the magnetic gap and generating heat with the electric current. When an electric current is fed to the heat generating member disposed in the vicinity of the magnetic gap, the heat generating member is caused to generate heat by Joule heat, thereby heating the magnetic recording medium to lower the magnetic-coercive. Information is recorded in the part decreased in its magnetic-coercive by the magnetic field from the magnetic gap. In this configuration, a leakage magnetic field generated in the magnetic gap can coincide with the generation position of Joule heat generated in the heat generating member disposed in the vicinity of the magnetic gap so as to perform high-speed and high-density heat-assisted magnetic recording.

According to the invention, a heat-assisted magnetic recording apparatus may include a magnetic recording medium a heat-assisted magnetic recording head having a pair of yokes, a heater which generates heat and a thin-film magnetic transducer to record signals at a part of the magnetic recording medium, and scanning unit which scans the heat-assisted magnetic recording head on the magnetic recording medium, wherein the heater is placed in the vicinity of the magnetic gap and the thin film magnetic transducer generates the magnetic field in its magnetic gap formed between its two magnetic poles of its yokes when a magnetic-coercive of the part of the magnetic recording medium is reduced.

The above-described heat-assisted magnetic recording head having the heater including the conductor or heat generating member may be applied to the heat-assisted magnetic recording apparatus, and in this configuration, high speed and high density heat-assisted magnetic recording can be performed by the heat-assisted magnetic recording head in which the leakage magnetic field generated in the magnetic gap coincides with the generation position of Joule heat generated in the conductor or heat generating member disposed in the magnetic gap or in the vicinity of the magnetic pole.

The entire disclosure of Japanese Patent Applications Nos. 2003-041527 and 2003-042327 filed on Feb. 19, 2003 and Feb. 20, 2003, respectively, including specification, claims, drawings and abstract is incorporated herein by reference in its entirety.

What is claimed is:

1. A heat-assisted magnetic recording head, comprising:
a thin film magnetic transducer having a pair of yokes and generating a magnetic field in a magnetic gap between two magnetic poles at the ends of the pair of yokes, wherein the electric resistance of at least one of the two magnetic poles is higher than that of the two yokes; and
a heater placed in the vicinity of the magnetic gap and generating heat with an electric current,
wherein a part of a magnetic recording medium in the vicinity of the magnetic gap is heated by the heater to reduce a magnetic-coercive of the part of the magnetic recording medium and the magnetic field generated by the thin film magnetic transducer is applied to the part of the magnetic recording medium, and the heater includes a conductor placed at the magnetic gap and electrically connected to the two magnetic poles, the conductor applying an electric current to the heater through the yokes to generate heat.

2. The heat-assisted magnetic recording head according to claim 1, wherein the electric resistance of the conductor is higher than that of the two magnetic poles.

3. The heat-assisted magnetic recording head according to claim 1, wherein the electric resistance of the conductor is lower than that of the two magnetic poles.

4. The heat-assisted magnetic recording head according to claim 1, wherein the Curie temperature of the two magnetic poles is higher than that of the two yokes.

5. The heat-assisted magnetic recording head according to claim 1, wherein the two yokes of the thin-film magnetic transducer is electrically insulated with an insulator inserted therebetween.

6. The heat-assisted magnetic recording head according to claim 5, wherein the insulator is made of ferrite.

7. The heat-assisted magnetic recording head according to claim 1, wherein the yoke is made of a low electric resistance material.

8. The heat-assisted magnetic recording head according to claim 1, wherein the yoke is made of staked thin films.

9. The heat-assisted magnetic recording head according to claim 1, wherein each of the yokes includes each of a pair of electrodes.

10. The heat-assisted magnetic recording head according to claim 1, wherein the thin film magnetic transducer includes a third magnetic pole, wherein the two magnet poles and the third magnetic pole are arranged in line.

11. The heat-assisted magnetic recording head according to claim 1, wherein the heater includes a heat generating member placed at the magnetic gap and generating heat with the electric current.

12. The heat-assisted magnetic recording head according to claim 11, wherein the heat generating member is a conductive element.

13. The heat-assisted magnetic recording head according to claim 12, wherein a dielectric spacer is placed between the heater and at least one of the magnetic poles.

14. The heat-assisted magnetic recording head according to claim 12, wherein the thin-film magnetic transducer includes a third magnetic pole, and the two magnet poles and the third magnetic pole are arranged in line.

15. The heat-assisted magnetic recording head according to claim 11, wherein at least one of the two magnetic poles acts as the heat generating member.

16. The heat-assisted magnetic recording head according to claim 11, wherein the heat generating member is made of a high electric resistive material.

17. The heat-assisted magnetic recording head according to claim 11, wherein the heater is connected to a pair of electric wires for feeding electric current to the heater.

18. The heat-assisted magnetic recording head according to claim 17, wherein the pair of electric wires are arranged perpendicular to the two magnetic yokes.

19. A heat-assisted magnetic recording apparatus, comprising:
a magnetic recording medium;
a heat-assisted magnetic recording head having a thin-film magnetic transducer having a pair of yokes having magnetic poles, respectively, the thin-film transducer generating a magnetic field in a magnetic gap between the two magnetic poles, and a heater placed in the vicinity of the magnetic gap and generating heat; and
a scanning unit that scans the heat-assisted magnetic recording head on the magnetic recording medium,
wherein a part of the magnetic recording medium in the vicinity of the magnetic gap is heated by the heater to reduce a magnetic-coercive of the part of the magnetic recording medium and the magnetic field generated by the thin-film transducer is applied to the part of the magnetic recording medium, and the heater includes a conductor placed at the magnetic gap and electrically connected to the two magnetic poles, the conductor applying an electric current to the heater through the yokes to generate heat, and
wherein the electric current applied to the heater is increased as the head is scanned from the inner part to the outer part along the radius of the magnetic recording medium.

20. A heat-assisted magnetic recording apparatus, comprising:
a magnetic recording medium;
a heat-assisted magnetic recording head having a thin-film magnetic transducer having a pair of yokes having magnetic poles, respectively, the thin-film transducer generating a magnetic field in a magnetic gap between the two magnetic poles, and a heater placed in the vicinity of the magnetic gap and generating heat; and
a scanning unit that scans the heat-assisted magnetic recording head on the magnetic recording medium,
wherein a part of the magnetic recording medium in the vicinity of the magnetic gap is heated by the heater to reduce a magnetic-coercive of the part of the magnetic recording medium and the magnetic field generated by the thin-film transducer is applied to the part of the magnetic recording medium, and the heater includes a conductor placed at the magnetic gap and electrically connected to the two magnetic poles, the conductor applying an electric current to the heater through the yokes to generate heat,
wherein the electric current is applied to the heater in a pulsed form before the magnetic field is applied, and
wherein the pulse width of the electric current is narrower than that of a current generating the magnetic field.

21. A heat-assisted magnetic recording apparatus, comprising:
a magnetic recording medium;
a heat-assisted magnetic recording head having a thin-film magnetic transducer having a pair of yokes having magnetic poles, respectively, the thin-film transducer generating a magnetic field in a magnetic gap between the two magnetic poles, and a heater placed in the vicinity of the magnetic gap and generating heat; and a scanning unit that scans the heat-assisted magnetic recording head on the magnetic recording medium, wherein a part of the magnetic recording medium in the vicinity of the magnetic gap is heated by the heater to reduce a magnetic-coercive of the part of the magnetic recording medium and the magnetic field generated by the thin-film transducer is applied to the part of the magnetic recording medium, and the heater includes a conductor placed at the magnetic gap and electrically connected to the two magnetic poles, the conductor applying an electric current to the heater through the yokes to generate heat, wherein the heater includes a heat generating member placed in the magnetic gap and electrically connected to the two magnetic poles, and an electric current is applied to the heat generating member through the yokes to heat the vicinity of the magnetic gap, thereby heating the magnetic recording medium, and wherein the electric current applied to the heat generating member is increased as the head is scanned from the inner part to the outer part along the radius of the magnetic medium.

22. A heat-assisted magnetic recording apparatus, comprising:

a magnetic recording medium;

a heat-assisted magnetic recording head having a thin-film magnetic transducer having a pair of yokes having magnetic poles, respectively, the thin-film transducer generating a magnetic field in a magnetic gap between the two magnetic poles, and a heater placed in the vicinity of the magnetic gap and generating heat; and a scanning unit that scans the heat-assisted magnetic recording head on the magnetic recording medium, wherein a part of the magnetic recording medium in the vicinity of the magnetic gap is heated by the heater to reduce a magnetic-coercive of the part of the magnetic recording medium and the magnetic field generated by the thin-film transducer is applied to the part of the magnetic recording medium, and the heater includes a conductor placed at the magnetic gap and electrically connected to the two magnetic poles, the conductor applying an electric current to the heater through the yokes to generate heat, wherein the heater includes a heat generating member placed in the magnetic gap and electrically connected to the two magnetic poles, and an electric current is applied to the heat generating member through the yokes to heat the vicinity of the magnetic gap, thereby heating the magnetic recording medium, wherein the electric current is applied to the heat generating member in a pulsed form before the magnetic field is applied, and wherein the pulse width of the electric current is narrower than that of a current generating the magnetic field.

\* \* \* \* \*